United States Patent
Dowlatkhah et al.

(10) Patent No.: US 10,805,899 B2
(45) Date of Patent: Oct. 13, 2020

(54) LOCATION ASSESSMENT SYSTEM FOR DRONES

(71) Applicants: AT&T INTELLECTUAL PROPERTY I, L.P., Atlanta, GA (US); AT&T Mobility II LLC, Atlanta, GA (US)

(72) Inventors: Sangar Dowlatkhah, Alpharetta, GA (US); Erie Lai Har Lau, Bellevue, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 65 days.

(21) Appl. No.: 14/974,235

(22) Filed: Dec. 18, 2015

(65) Prior Publication Data

US 2017/0181117 A1 Jun. 22, 2017

(51) Int. Cl.
*H04W 64/00* (2009.01)
*H04W 40/20* (2009.01)
(Continued)

(52) U.S. Cl.
CPC ........... *H04W 64/003* (2013.01); *H04L 67/12* (2013.01); *H04W 4/46* (2018.02);
(Continued)

(58) Field of Classification Search
CPC .... H04W 64/003; H04W 24/02; H04W 40/20
(Continued)

(56) References Cited

U.S. PATENT DOCUMENTS

| 4,783,799 A | 11/1988 | Maass |
| 7,672,281 B1 | 3/2010 | Humphries et al. |
| (Continued) | | |

FOREIGN PATENT DOCUMENTS

| GB | 2476149 | 7/2014 |
| KR | 101473416 | 12/2014 |
| (Continued) | | |

OTHER PUBLICATIONS

Bamberger et al. "Flight demonstrations of unmanned aerial vehicle swarming concepts." Johns Hopkins APL Technical Digest 27.1 (2006): 41-55.
(Continued)

*Primary Examiner* — Jae Y Lee
*Assistant Examiner* — Jean F Voltaire
(74) *Attorney, Agent, or Firm* — BakerHostetler

(57) ABSTRACT

A system for locating unmanned mobile connected objects, such as, but not limited to, unmanned aerial vehicles (UAVs), such as, but not limited to drones, and unmanned ground vehicles (UGVs) is disclosed. A command center may be configured to identify current locations of unmanned mobile connected objects, predict future locations of unmanned mobile connected objects, predict and prevent collisions of unmanned mobile connected objects, identify unpredictable variables, such as, but not limited to, plane crashes, disaster areas, cranes interfering with flight paths and no-fly zones and search for unmanned mobile connected objects even if there is no radio signal coverage or in situations when radio signals are inactive, such as during disasters and emergency situations. The system may be configured such that an unmanned mobile connected object may populate a neighboring table with information such as geolocation, cell signal strength, and status, and may be shared with a command center.

18 Claims, 7 Drawing Sheets

(51) Int. Cl.
  *H04W 4/46*  (2018.01)
  *H04W 36/00*  (2009.01)
  *H04L 29/08*  (2006.01)
  *H04W 24/02*  (2009.01)
  *H04W 84/18*  (2009.01)

(52) U.S. Cl.
  CPC ....... *H04W 36/0083* (2013.01); *H04W 40/20* (2013.01); *H04W 24/02* (2013.01); *H04W 84/18* (2013.01)

(58) Field of Classification Search
  USPC ........................................................ 370/254
  See application file for complete search history.

(56) References Cited

U.S. PATENT DOCUMENTS

| | | | |
|---|---|---|---|
| 8,159,976 | B2 | 4/2012 | El-Damhougy |
| 8,639,396 | B1* | 1/2014 | Hirsch ................. G08G 5/0008 244/76 R |
| 8,645,005 | B2 | 2/2014 | Elkins |
| 8,948,927 | B1 | 2/2015 | Piponi |
| 9,026,272 | B2 | 5/2015 | Kokkeby et al. |
| 9,047,717 | B2 | 6/2015 | Weinmann et al. |
| 9,051,043 | B1 | 6/2015 | Peeters et al. |
| 9,102,406 | B2 | 8/2015 | Stark et al. |
| 9,104,201 | B1 | 8/2015 | Pillai et al. |
| 9,927,807 | B1* | 3/2018 | Ganjoo ................... H04W 4/70 |
| 2003/0164794 | A1 | 9/2003 | Haynes et al. |
| 2006/0058931 | A1* | 3/2006 | Ariyur ................. G05D 1/0223 701/23 |
| 2007/0118555 | A1* | 5/2007 | Go .......................... G06N 7/005 |
| 2007/0288132 | A1 | 12/2007 | Lam |
| 2011/0212254 | A1* | 9/2011 | Morton ................. B05B 12/124 427/8 |
| 2012/0290152 | A1 | 11/2012 | Cheung et al. |
| 2013/0338858 | A1* | 12/2013 | Cherepinsky ..... G06F 17/30598 701/3 |
| 2014/0032034 | A1 | 1/2014 | Raptopoulos et al. |
| 2014/0035725 | A1 | 2/2014 | Bruemmer et al. |
| 2014/0129075 | A1 | 5/2014 | Carleton |
| 2014/0146766 | A1 | 5/2014 | Porjo et al. |
| 2014/0222250 | A1 | 8/2014 | Khazan et al. |
| 2014/0249692 | A1 | 9/2014 | Levien et al. |
| 2014/0292509 | A1 | 10/2014 | Hildick-Pytte |
| 2015/0120094 | A1 | 4/2015 | Kimichi et al. |
| 2015/0134143 | A1 | 5/2015 | Willenborg |
| 2015/0142211 | A1* | 5/2015 | Shehata ................. H04N 7/181 701/2 |
| 2015/0244451 | A1 | 8/2015 | Baeckman et al. |
| 2017/0235316 | A1* | 8/2017 | Shattil ................... B64C 39/024 701/3 |

FOREIGN PATENT DOCUMENTS

| | | |
|---|---|---|
| WO | 2014127104 | 8/2014 |
| WO | 2015114572 | 8/2015 |

OTHER PUBLICATIONS

Hauert et al., "Evolved swarming without positioning information: an application in aerial communication relay." Autonomous Robots 26.1 (2009): 21-32.

Vincent et al., "A framework and analysis for cooperative search using UAV swarms." Proceedings of the 2004 ACM symposium on Applied computing. ACM, 2004.

Sivakumar et al., "UAV swarm coordination using cooperative control for establishing a wireless communications backbone." Proceedings of the 9th International Conference on Autonomous Agents and Multiagent Systems: vol. 3-vol. 3. International Foundation for Autonomous Agents and Multiagent Systems, 2010.

Palat et al., "Cooperative relaying for ad-hoc ground networks using swarm UAVs." Military Communications Conference, 2005. MILCOM 2005. IEEE. IEEE, 2005.

* cited by examiner

| NAME | CLASSIFICATION | STATUS | GEOLOCATION | SIGNAL STRENGTH |
|---|---|---|---|---|
| A | TRANSPORT | ACTIVE | X,Y,Z | -2DB |
| B | SURVEILLANCE | INACTIVE | X,Y,Z | -1DB |
| C | MULTI SENSORS | ACTIVE | X,Y,Z | -3DB |

FIG. 2

LOCATION ASSESSMENT SYSTEM FOR DRONES

FIELD OF THE INVENTION

The present application relates to route-optimization technologies, drone technologies, and device management technologies, and more particularly, to a system and method for locating drones.

BACKGROUND

More and more drones are being used today for military applications, aerial photography and the like. Currently, drones include unmanned objects such as unmanned aerial vehicles and unmanned ground vehicles. Currently, each drone is controlled via a single controller and is deployed on a mission. If a drone becomes unresponsive, the controller of that drone is aware that a problem has occurred and that the drone may have been destroyed. The knowledge of the demise of the single drone is typically held by the controller of that drone and no one else. As the use of drones becomes more prevalent, the number of drones operating at any given time will likely to be ever increasing. Similarly, as companies, organizations, defense forces and the like accumulate ever increasing fleets of drones, the task of accounting for each of these drones with single controllers becomes increasing more difficult.

SUMMARY

A system for locating unmanned mobile connected objects, such as, but not limited to, unmanned aerial vehicles (UAVs), such as, but not limited to drones, and unmanned ground vehicles (UGVs) is disclosed. The system may be configured such that an unmanned mobile connected object may populate a neighboring table with information such as geolocation, cell signal strength, status and the like. The neighboring table may be shared with an command center via a communications network and shared with other unmanned mobile connected objects. The command center may contact the unmanned mobile connected objects through a primary communications network. The command center may contact unmanned mobile connected objects not in primary contact with the command center via the primary communication network via hopping through one or more unmanned mobile connected objects. As such, the command center may remain in contact with unmanned mobile connected objects outside of primary communication network, such as, but not limited to, cellular signal radio frequencies. The command center may be configured to identified current locations of unmanned mobile connected objects, predict future locations of unmanned mobile connected objects, predict and prevent collisions of unmanned mobile connected objects, identify unpredictable variables, such as, but not limited to, plane crashes, disaster areas, cranes interfering with flight paths and no-fly zones and search for unmanned mobile connected objects even if there is no radio signal coverage or in situations when radio signals are inactive, such as during disasters or in emergency situations.

The system for locating unmanned mobile connected objects may include a communications network. The communications network of the system may be configured to link each of the devices in the system to one another. For example, the communications network may be utilized to connect a command center with one or more unmanned mobile connected objects. The command center may be any component capable of performing the analyses discussed herein. In at least one device, the command center may be a portion of the communications network. The command center may be a standalone device, a first user device, a second user device, a server or any other device. The communications network may be utilized by a first user device to connect with other devices within or outside communications network. Additionally, the communications network may be configured to transmit, generate, and receive any information and data traversing the system. In certain embodiments, the communications network may include any number of servers, databases, or other componentry, and may be controlled by a service provider. In certain embodiments, the communications network may be subscribed to by a company, first and second users or a combination thereof.

The system may include a first unmanned mobile connected object formed from a memory that stores instructions and a processor that executes the instructions to perform operations. The operations may include receiving classification information associated with the first unmanned mobile connected object and populating fields in a neighboring table of the first unmanned mobile connected object with the information associated with a first unmanned mobile connected object. The operations may also include transmitting the neighboring table to a second unmanned mobile connected object and receiving classification information associated with the second unmanned mobile connected object to populate the neighboring table. The operations may include receiving classification information associated with the first unmanned mobile connected object comprising name, classification, status, geolocation and signal strength. The operations may also include populating the neighboring table in the first unmanned mobile connected object with the information associated with the second unmanned mobile connected object. The operations may include transmitting the neighboring table to a network. The operations may also include determining whether a primary communication path exists between the first unmanned mobile connected object and a network, and if a primary connection does not exist between the first unmanned mobile connected object and the network, establishing an ad hoc communication connection with the second unmanned mobile connected object.

The operations may include establishing an ad hoc communication connection with the second unmanned mobile connected object if the second unmanned mobile connected object shares a common classification of geographic area or capability with the first unmanned mobile connected object. The operations may also include establishing an ad hoc communication connection with the second unmanned mobile connected object via broadcasting requests to establish an ad hoc communication connection with the second unmanned mobile connected object. The operations may include receiving an acknowledgement from the second unmanned mobile connected object when the ad hoc communication connection is established. The operations may also include analyzing the second unmanned mobile connected object and a third unmanned mobile connected object via the ad hoc communication to determine which to use as a hop to expand range of the ad hoc communication to connect with the network.

In certain embodiments, the system may include a first unmanned mobile connected object formed from a memory that stores instructions and a processor that executes the instructions to perform operations. The operations may include receiving a neighboring table from a first unmanned mobile connected object, wherein the neighboring table includes information associated with the first unmanned mobile connected object and a second unmanned mobile connected object. The operations may also include creating at least one prediction based upon the information in the neighboring table associated with the first and second unmanned mobile connected objects. The operations may include receiving the neighboring table from the first unmanned mobile connected object comprises receiving the neighboring table from the first unmanned mobile connected object within repetitive predetermined time intervals. The operations may include creating predictions based upon the first information associated with a first unmanned mobile connected object comprises predicting a location of the first unmanned mobile connected object. The operations may also include predicting a location of the first unmanned mobile connected object is based upon a last received neighboring table from the first unmanned mobile connected object if the first unmanned mobile connected object is not in communication with the system.

The operations may include generating an alert if an unmanned mobile connected object that was in communication with the system no longer communicates with the system within the predetermined time interval indicating a potential loss of the unmanned mobile connected object. The operations may also include searching the information associated with a first unmanned mobile connected object for unpredictable variables in the physical environment surrounding the first unmanned mobile connected object. The operations may include creating the one or more predictions based upon the information in the neighboring table comprises determining whether the first and second unmanned mobile connected objects are on a collision path. The operations may include searching local available unmanned mobile connected objects based upon current geolocations. The operations may also include searching local available unmanned mobile connected objects based upon predicted geolocations. The operations may include generating a map with locations of the first and second unmanned mobile connected objects with predicted travel paths.

According to another embodiment, a computer-readable device may include instructions, which when executed by a processor, cause the processor to perform operations. The operations may include receiving a neighboring table from a first unmanned mobile connected object, wherein the neighboring table includes information associated with the first unmanned mobile connected object and a second unmanned mobile connected object. The operations may also include creating one or more predictions based upon the information in the neighboring table associated with the first and second unmanned mobile connected objects.

These and other embodiments are described in more detail below.

BRIEF DESCRIPTION OF THE DRAWINGS

The accompanying drawings, which are incorporated in and form a part of the specification, illustrate embodiments of the system for locating unmanned mobile connected objects and, together with the description, disclose the principles of the systems and methods discloses herein.

FIG. 2 is a neighboring chart usable in the system for collecting information related to the unmanned mobile connected objects.

DETAILED DESCRIPTION OF THE INVENTION

Figure 1:
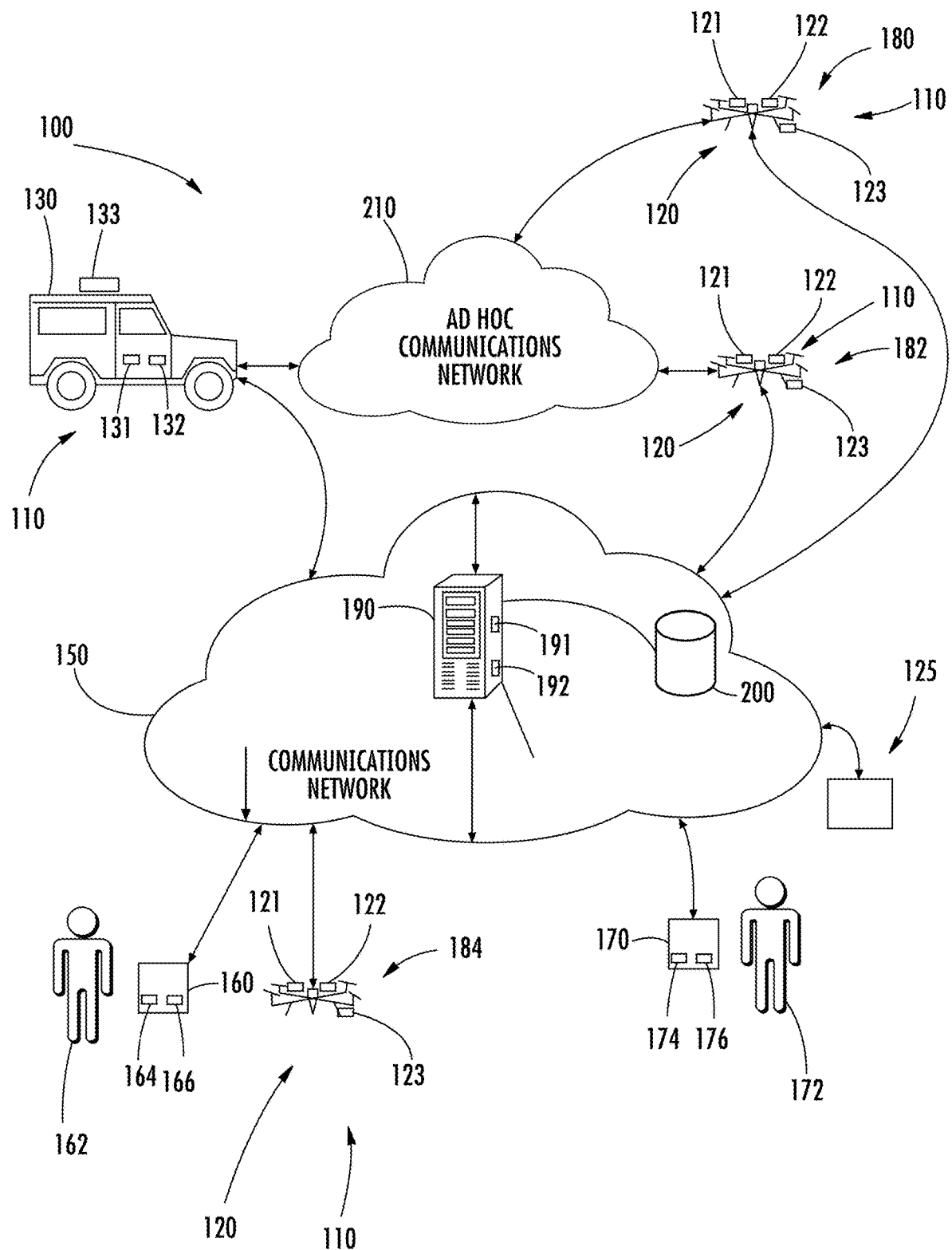
FIG. 1 is a schematic diagram of a system locating unmanned mobile connected objects, such as, but not limited to, unmanned aerial vehicles, such as, but not limited to drones, and unmanned ground vehicles, according to an embodiment of the present disclosure.

As shown in 1-7, a system 100 for locating unmanned mobile connected objects 110, such as, but not limited to, unmanned aerial vehicles (UAVs) 120, such as, but not limited to drones, and unmanned ground vehicles (UGVs) 130 is disclosed. The system 100 may be configured such that an unmanned mobile connected object 110 may populate a neighboring table 140 with information such as geolocation, cell signal strength, status and the like. The neighboring table 140 may be shared with a network 150 and other unmanned mobile connected objects 110. A command center 125 may contact the unmanned mobile connected objects 110 through one or more primary communications networks 150. The command center 125 may contact unmanned mobile connected objects 110 not in primary contact with the primary communications network 150 via hopping through one or more unmanned mobile connected objects 110. As such, the command center 125 may remain in contact with unmanned mobile connected objects 110 outside of primary communications, such as, but not limited to, cellular signal radio frequencies. The command center 125 may be configured to identify current locations of unmanned mobile connected objects 110, predict future locations of unmanned mobile connected objects 110, predict and prevent collisions of unmanned mobile connected objects 110, identify unpredictable variables, such as, but not limited to, plane crashes, disaster areas, cranes interfering with flight paths and no-fly zones and search for unmanned mobile connected objects 110 even if there is no radio signal coverage or in situations when radio signals are inactive, such as during disasters or in emergency situations.

Figure 6:
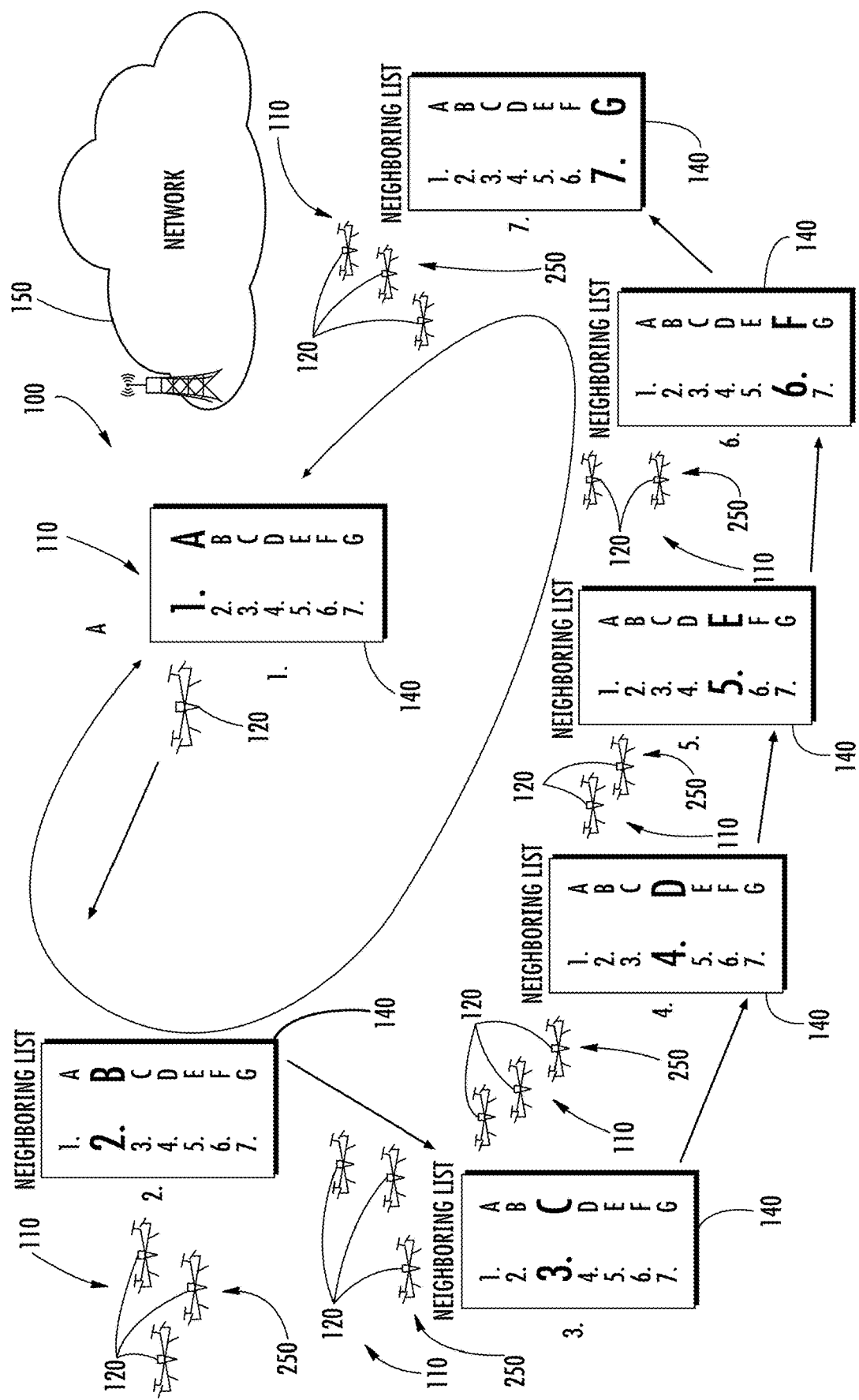
FIG. 6 is a schematic diagram of a system locating unmanned mobile connected objects, such as, but not limited to, unmanned aerial vehicles, such as, but not limited to drones, and unmanned ground vehicles, according to an embodiment of the present disclosure.

As shown in FIGS. 1 and 6, the system 100 for locating unmanned mobile connected objects 110, such as, but not limited to, unmanned aerial vehicles (UAVs) 120, such as, but not limited to drones, and unmanned ground vehicles (UGVs) 130 is disclosed. The system 100 may include a communications network 150. The communications network 150 of the system 100 may be configured to link each of the devices in the system 100 to one another. For example, the communications network 150 may be utilized to connect a command center 125 with one or more unmanned mobile connected objects 110. The command center 125 may be any component capable of performing the analyses discussed herein. In at least one device, the command center 125 may be a portion of the communications network 150. The command center 125 may be a standalone device, a first user device 160, a second user device 170, a server 190 or any other device. The communications network 150 may be utilized by a first user device 160 to connect with other devices within or outside communications network 150. Additionally, the communications network 150 may be configured to transmit, generate, and receive any information and data traversing the system 100. In certain embodiments, the communications network 150 may include any number of servers, databases, or other componentry, and may be controlled by a service provider. In certain embodiments, the communications network 150 may be subscribed to by a company, first and second users 162, 172, or a combination thereof. The communications network 150 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, one or more servers 190 is shown as being included within communications network 150. In certain embodiments, the server 150 may serve as an information server for processing information received from the unmanned mobile connected objects 110. In certain embodiments, the communications network 150 may be part of a single autonomous system that is located in a particular geographic region, or be part of multiple autonomous systems that span several geographic regions.

Notably, the functionality of the system 100 may be supported and executed by using any combination of one or more servers 190. As mentioned above, the server 190 may reside in communications network 150, however, in certain embodiments, the server 190 may reside outside communications network 150. As mentioned above, the server 190 may reside in a command center 125, however, in certain embodiments, the server 190 may reside outside command center 125. In certain embodiments, the server 190 may include a memory 191 that includes instructions, and a processor 192 that executes the instructions from the memory 191 to perform various operations that are performed by the server 190. The processor 192 may be hardware, software, or a combination thereof. In certain embodiments, the servers 190 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the server 190 may be communicatively linked to the communications network 150, the command center 125, any network, any device in the system 100, or any combination thereof.

The database 200 of the system 100 may be utilized to store and relay information that traverses the system 100, cache content that traverses the system 100, store data about each of the devices in the system 100 and perform any other typical functions of a database. In certain embodiments, the database 200 may be connected to or reside within the communications network 150, the command center 125, any other network, or a combination thereof. In certain embodiments, the database 200 may serve as a central repository for any information associated with any of the devices and information associated with the system 100. Furthermore, the database 200 may include a processor and memory or be connected to a processor and memory to perform the various operation associated with the database 200. In certain embodiments, the database 200 may be connected to the unmanned mobile connected objects 110, the server 190, the first user device 160, the second user device 170, any devices in the system 100, any other device, any network, or any combination thereof.

The database 200 may also store information and metadata obtained from the system 100, store metadata and other information associated with the first and second users 162, 172, store user profiles associated with the first and second users 162, 172, store device profiles associated with any device in the system 100, store communications traversing the system 100, store user preferences, store information associated with any device or signal in the system 100, store information relating to patterns of usage relating to the first and second user devices 162, 172, store any information obtained from any of the networks in the system 100, store historical data associated with the first and second users 162, 172, store device characteristics, store history information for various types of items, products and services, store user purchase history information, store information relating to any devices associated with the first and second users 162, 172, store information associated with orders made in the system 100, store any information associated with the unmanned mobile connected objects 110, store inventory information associated with unmanned mobile connected objects 110, store any type of routing information, store any information generated and/or processed by the system 100, store any of the information disclosed for any of the operations and functions disclosed for the system 100 herewith, store any information traversing the system 100, or any combination thereof. Furthermore, the database 200 may be configured to process queries sent to it by any device in the system 100.

The system 100 may include one or more unmanned mobile connected objects 110, such as, but not limited to, an unmanned aerial vehicle 120, such as, but not limited to, a drone, and an unmanned ground vehicle 130. The unmanned aerial vehicle 120 may be any type of mobile connected device capable of flying. The unmanned aerial vehicle 120 may have any configuration enabling flight such as, but not limited to, permanent wings, foldable wings and rotary wings. For example, the unmanned aerial vehicle 120 may be capable of flying from a departure location to an intended destination and back to the departure location for a variety of purposes, including, but not limit to, delivering items, conducting surveillance, military operations, and capturing video or still images. The unmanned aerial vehicle 120 may include a memory 121 that includes instructions, and a processor 122 that executes the instructions from the memory 121 to perform the various operations that are performed by the unmanned aerial vehicle 120. In certain embodiments, the processor 122 may be hardware, software, or a combination thereof. The unmanned aerial vehicle 120 may include one or more transmitters, receivers, or transceivers, or any combination thereof necessary to establish communications with the communications network 150, the command center 125 and one or more other unmanned mobile connected objects 110 via the communications network 150, an ad hoc network 210, and any other means. The unmanned aerial vehicle 120 may also include a power source, which may be any type of power source including, but not limited to, a battery, a solar-powered power source, an electric power source, a magnetic-based power source, an inductive-based power source, any type of power source, or any combination thereof.

In certain embodiments, the unmanned ground vehicle 130 may be an unmanned terrestrial vehicle that is capable of traversing various types of land-based environments. The unmanned ground vehicle 130 may include a memory 131 that includes instructions, and a processor 132 that executes the instructions from the memory 131 to perform the various operations that are performed by the drone 130. In certain embodiments, the processor 132 may be hardware, software, or a combination thereof. The unmanned ground vehicle 130 may include one or more transmitters, receivers, or transceivers, or any combination thereof necessary to establish communications with the communications network 150, the command center 125 and one or more other unmanned mobile connected objects 110 via the communications network 150, an ad hoc network 210, and any other means. The unmanned ground vehicle 130 may also include a power source 133, which may be any type of power source including, but not limited to, a battery, a solar-powered power source, an electric power source, a magnetic-based power source, an inductive-based power source, any type of power source, or any combination thereof.

The system 150 may include a first user 162, who may utilize a first user device 160, as shown in FIG. 1, to access data, content, and services, or to perform a variety of other tasks and functions. As an example, the first user 162 may utilize first user device 160 to transmit signals to access various online services and content, such as those provided by a content provider or service provider associated with communications network 150. As another example, the first user 162 may utilize first user device 160 to obtain the current locations of unmanned mobile connected objects 110, obtain predictions of future locations of unmanned mobile connected objects 110, obtain predictions of collisions of unmanned mobile connected objects 110, obtain identifications of unpredictable variables, such as, but not limited to, plane crashes, disaster areas, cranes interfering with flight paths and no-fly zones and search for unmanned mobile connected objects 110 even if there is no radio signal coverage or in situations when radio signals are inactive, such as during disasters or in emergency situations. In certain embodiments, the first user 162 may be a subscriber of a service provider that controls communications network 150. The first user device 160 may include a memory 164 that includes instructions, and a processor 166 that executes the instructions from the memory 164 to perform the various operations that are performed by the first user device 160. In certain embodiments, the processor 166 may be hardware, software, or a combination thereof. In certain embodiments, the first user device 160 may be a computer, a laptop, a set-top-box, a tablet device, a phablet, a server, a mobile device, a smartphone, a smart watch, or any other type of computing device. In at least one embodiment, the first user device 160 may operate as a command center 125.

In addition to the first user 162, the system 100 may also include a second user 172, who may utilize a second user device 170, as shown in FIG. 1, to perform a variety of functions. For example, the second user device 170 may be utilized by the second user 172 to transmit signals to request various types of content, services, and data provided by content and service providers associated with the communications network 150 or any other network in the system 100. Also, the second user 172 may utilize second user device 170 to obtain the current locations of unmanned mobile connected objects 110, obtain predictions of future locations of unmanned mobile connected objects 110, obtain predictions of collisions of unmanned mobile connected objects 110, obtain identifications of unpredictable variables, such as, but not limited to, plane crashes, disaster areas, cranes interfering with flight paths and no-fly zones and search for unmanned mobile connected objects 110 even if there is no radio signal coverage or in situations when radio signals are inactive, such as during disasters or in emergency situations. In certain embodiments, the second user 172 may be a subscriber of a service provider that controls communications network 150. The second user device 170 may include a memory 174 that includes instructions, and a processor 176 that executes the instructions from the memory 174 to perform the various operations that are performed by the second user device 170. In certain embodiments, the processor 176 may be hardware, software, or a combination thereof. Similar to the first user device 160, in certain embodiments, the second user device 170 may be a computer, a laptop, a tablet device, a phablet, a server, a mobile device, a smartphone, a smart watch, or any other type of computing device. In at least one embodiment, the second user device 170 may operate as a command center 125.

In certain embodiments, the first user device 160 and the second user device 170 may have any number of software applications and/or application services stored and/or accessible thereon. For example, the first and second user devices 160, 170 may include cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 162, 172 to readily interact with the software applications. The software applications and services may also be utilized by the first and second users 162, 172 to interact with the any device in the system 100, any network in the system 100, or any combination thereof. In certain embodiments, the first user device 160 and the second user device 170 may include associated telephone numbers, device identities, or any other identifiers to uniquely identify the first and second user devices 160, 170.

In certain embodiments, the server 190 may also serve as a command center 125 for any number of unmanned mobile connected objects 110. In serving as the command center 125, the server 190 may be configured to receive various types of information from the unmanned mobile connected objects 110, such as, but not limited to, neighboring tables 140, as shown in FIG. 2, with information such as, but not limited to, name 220 of the unmanned mobile connected object 110, classification 222, status 224, geolocation 226, signal strength 228, route name, battery information (e.g. current battery level and/or charge level), drone lifespan information. Any of information received and/or generated by the server 190 as the command center 125 may be transmitted to any devices and/or networks in the system 100. For example, the neighboring tables 140 may be received by the server 190 in the network 150 from one or more of the unmanned mobile connected objects 110, and in certain embodiments, from each of the unmanned mobile connected objects 110. The server 190 may conduct numerous analyses, as set forth below, and the results may be communicated to the unmanned mobile connected objects 110.

While FIG. 1 illustrates one configuration of the various components of the system 100, the system 100 may include any configuration of the components, which may include using a greater or lesser number of the components. For example, the system 100 is illustratively shown as including a command center 125, a first user device 162, a second user device 170, an unmanned ground vehicle 130, a first unmanned aerial vehicle 180, a second unmanned aerial vehicle 182, a third unmanned aerial vehicle 184, a communications network 150, a first user device 160, a second user device 170, a server 190, a database 200, and an ad hoc communications network 210. However, the system 100 may include multiple command centers 125, multiple first user devices 162, multiple second user devices 170, multiple unmanned ground vehicles 130, multiple first unmanned aerial vehicles 180, multiple second unmanned aerial vehicles 182, multiple third unmanned aerial vehicles 184, multiple communications networks 150, multiple first user devices 160, multiple second user devices 170, multiple servers 190, multiple databases 200, and multiple an ad hoc communications networks 210, or any number of any of the other components inside or outside the system 100. Furthermore, in certain embodiments, substantial portions of the functionality and operations of the system 100 may be performed by other networks and systems that may be connected to system 100.

The system 100, via the command center 125, may be configured to manage the locations of one or more, and in some embodiments, thousands, of unmanned mobile connected objects 110, including, but not limited to, unmanned aerial vehicles 120 and unmanned ground vehicles 130. The system 100, via the command center 125, may manage the unmanned mobile connected objects 110 to ensure the safety of the unmanned mobile connected objects 110 and limit the loss of the unmanned mobile connected objects 110 to limit loss of capital. In at least one embodiment, the system 100 may be configured such that a first unmanned mobile connected object 110 includes memory 191 that stores instructions and a processor 192 that executes the instructions to perform operations. The operations may include receiving classification information associated with the first unmanned mobile connected object 110. The first unmanned mobile connected object 110 may populate fields in a neighboring table 140 of the first unmanned mobile connected object 110 with the information associated with a first unmanned mobile connected object 100. In particular, the first unmanned mobile connected object 110 may populate fields, such as, but not limited to, name 220 of the unmanned mobile connected object 110, classification 222, status 224, geolocation 226, signal strength 228, route name, battery information (e.g. current battery level and/or charge level), drone lifespan information. The first unmanned mobile connected object 110 may populate fields once within a specified time period. The information may be updated every time period so that the information contained within the neighboring table is accurate. The first unmanned mobile connected object 110 may send the neighboring table 140 with updates concerning the first unmanned mobile connected object 110 to the via the command center 125 via the communication network 150 and all other unmanned mobile connected objects 110 in communication with the communication network 150. For instance, the first unmanned mobile connected object 110 may transmit the neighboring table 140 to a second unmanned mobile connected object 110. Also, the first unmanned mobile connected object 110 may send the neighboring table 140 to other unmanned mobile connected objects 110 that are not in communication with the command center 125 via the primary communication network 150 via an ad hoc communications network 210.

The ad hoc communications network 210 may be established when any unmanned mobile connected object 110 is out of range of the primary communications network 150. In at least one embodiment, the ad hoc communications network 210 may be established via wireless communications between two or more unmanned mobile connected objects 110. The ad hoc communications network 210 may be formed with wireless communications directly between the unmanned mobile connected objects 110. The ad hoc communications network 210 may be formed with communications via any means possible, such as, but not limited to, any wireless communications systems. In certain embodiments, an ad hoc communication connection with a second unmanned mobile connected object 110 may be established with a first unmanned mobile connected object 110 if the second unmanned mobile connected object 110 shares a common classification of geographic area or capability with the first unmanned mobile connected object 110. The ad hoc communication network 210 with the second unmanned mobile connected object 110 may be established via ad hoc communications. The first unmanned mobile connected object 110 may receive an acknowledgement from the second unmanned mobile connected object 110 when the ad hoc communication connection is established. The unmanned mobile connected objects 110 may also communicate with each other via broadcasting requests to establish communications between each other.

The wireless communications from unmanned mobile connected object 110 to unmanned mobile connected object 110 forming the ad hoc communications network 210 may be configured such that each node is willing to forward data for other nodes, and so the determination of which nodes forward data is made dynamically based on the network connectivity. The ad hoc communications network 210 enables data, such as, but not limited to, the neighboring tables 140 to be communicated to the command center 125 in communication with the primary communications network 150 even when the primary communications network 150 is not in contact with the unmanned mobile connected object 110. As such, when an unmanned mobile connected object 110 is out of range of the primary communications network 150, a neighboring table 140 from that unmanned mobile connected object 110 may be communicated to the command center 125 in communication with the primary communications network 150 by passing the neighboring table 140 through one or more unmanned mobile connected objects 110 in contact with the primary communications network 150. One or more components of the system 100, such as, but not limited to, the command center 125, may perform an analysis to determine which unmanned mobile connected object to use as a hop to expand range of the ad hoc communication 210 to connect with the network 150. In at least one embodiment, the command center 125 may analyze the strength of signals 228, geolocation 226, and classification 222 associated with each unmanned mobile connected object 110 on the neighboring table 140 to determine which unmanned mobile connected object 110 to use as a hop to expand range of the ad hoc communication 210 to connect with the network 150. The system 100 may use multiple hops until the communications network 150 establishes a communication path from an unmanned mobile connected object 110 to the command center 125 in the primary communications network 150.

While a first unmanned mobile connected object 110 transmits a neighboring table 140 to a second unmanned mobile connected object 110, the first unmanned mobile connected object 110 may receive a neighboring table 140 from the second unmanned mobile connected object 110. The first unmanned mobile connected object 110 may update the neighboring table with information associated with the first unmanned mobile connected object 110. In other embodiments, the second unmanned mobile connected object 110 may send information associated with the second unmanned mobile connected object 110 to the first unmanned mobile connected object 110, and the first unmanned mobile connected object 110 may populate the neighboring table 140 contained in the first unmanned mobile connected object 110. The updated neighboring table 140 may be stored in the first unmanned mobile connected object 110. The updated neighboring table 140 may also be sent to the server 190 in the primary communications network 150 and to the second unmanned mobile connected object 110 and other unmanned mobile connected objects 110.

The system 100 may be configured such that the command center 125 receives a neighboring table 140 from a first unmanned mobile connected object 110, whereby the neighboring table 140 includes information associated with the first unmanned mobile connected object 110 and a second unmanned mobile connected object 110. The command center 125 may create one or more predictions based upon the information in the neighboring table 140 associated with the first and second unmanned mobile connected objects 110. The command center 125 may be, but is not limited to, the first user device 160, the second user device 170, server 190 or any other device configured to perform an analysis of data received from the first and second unmanned mobile connected objects 110. The command center 125 may include a memory that stores instructions and a processor that executes the instructions to perform operations, as previously set forth for each of the devices listed above.

The command center 125 may receive one or more neighboring tables 140 from the first unmanned mobile connected object 110 within repetitive predetermined time intervals. The time interval may be, but is not limited to being, a fraction of a second, one second, 10 seconds, 30 seconds or longer. As such, the command center 125 may receive one or more neighboring tables 140 once within every time period. The time periods may remain constant or may fluctuate.

The command center 125 may create predictions based upon the information associated with a first unmanned mobile connected object 110. For example, and not by way of limitation, the command center 125 may include predicting a location of the first unmanned mobile connected object 110. If the first unmanned mobile connected object 110 is not in communication with the system, the command center 125 may predict a location of the first unmanned mobile connected object 110 based upon a last received neighboring table 140 from the first unmanned mobile connected object 110.

The system 100 may be configured such that an alert is generated if an unmanned mobile connected object 110 that was in communication with the system no longer communicates with the system 100 within the predetermined time interval indicating a potential loss of the unmanned mobile connected object 100. In at least one embodiment, if the unmanned mobile connected object 110 that was in communication with one or more of the other unmanned mobile connected objects 110, the primary communication network 150 or the server 190, no longer is in communication with these components, then an alert may be generated. In certain embodiments, the command center 125 may generate the alert. The alert may be sent to one or more user devices 160, 170, to the systems controlling the travel of the unmanned mobile connected objects and the like. The alert may be a visual alert such as, but not limited to a message, a blinking icon representing the unmanned mobile connected object 110 and the like.

The system 100 may also be configured such that the command center 125 searches information associated with a first unmanned mobile connected object 110 for unpredictable variables in the physical environment surrounding the first unmanned mobile connected object 110. In at least one embodiment, the information associated with a first unmanned mobile connected object 110 may be searched by the command center 125 that may be, but is not limited to, the first user device 160, the second user device 170, server 190 or any other device configured to perform an analysis of data received from the first unmanned mobile connected object 110. The command center 125 may search for any anomalies signifying one or more of air turbulence, a flock of birds, plane crashes, disaster areas, cranes interfering with flight paths, and the like. If the command center 125 identifies unpredictable variables in the physical environment surrounding the first unmanned mobile connected object 110, the command center may send notification to the first unmanned mobile connected object 110. Either the first unmanned mobile connected object 110 or the command center 125 may calculate a revised travel route based upon the unpredictable variables in the physical environment surrounding the first unmanned mobile connected object 110.

The system 100 may be configured such that one or more of the unmanned mobile connected objects 110 or the command center 125, or both, can calculate an optimal travel path based on routes traveled. The system 100 thus, may have a learning behavior associated with operations of the unmanned mobile connected objects 110. The unmanned mobile connected objects 110 or the command center 125, or both, may calculate optimal routes based on speed, time, and other factors.

The system 100 may be configured to create one or more predictions based upon the information in the neighboring table to determine whether the first and second unmanned mobile connected objects are on a collision path. In certain embodiments, the command center 125 may be configured to use neighboring tables to determine the flight paths and travel routes for each unmanned mobile connected object 110 in the system 100. As such, the command center plots where each unmanned mobile connected object 110 has been. Based upon this information, the command center 125 may predict whether any of the unmanned mobile connected objects 110 will collide. If a collision is predicted, the command center 125 may inform the control operations of the unmanned mobile connected objects 110 of such prediction or alter the flight paths and travel routes of the unmanned mobile connected objects 110 predicted to collide.

Figure 7:
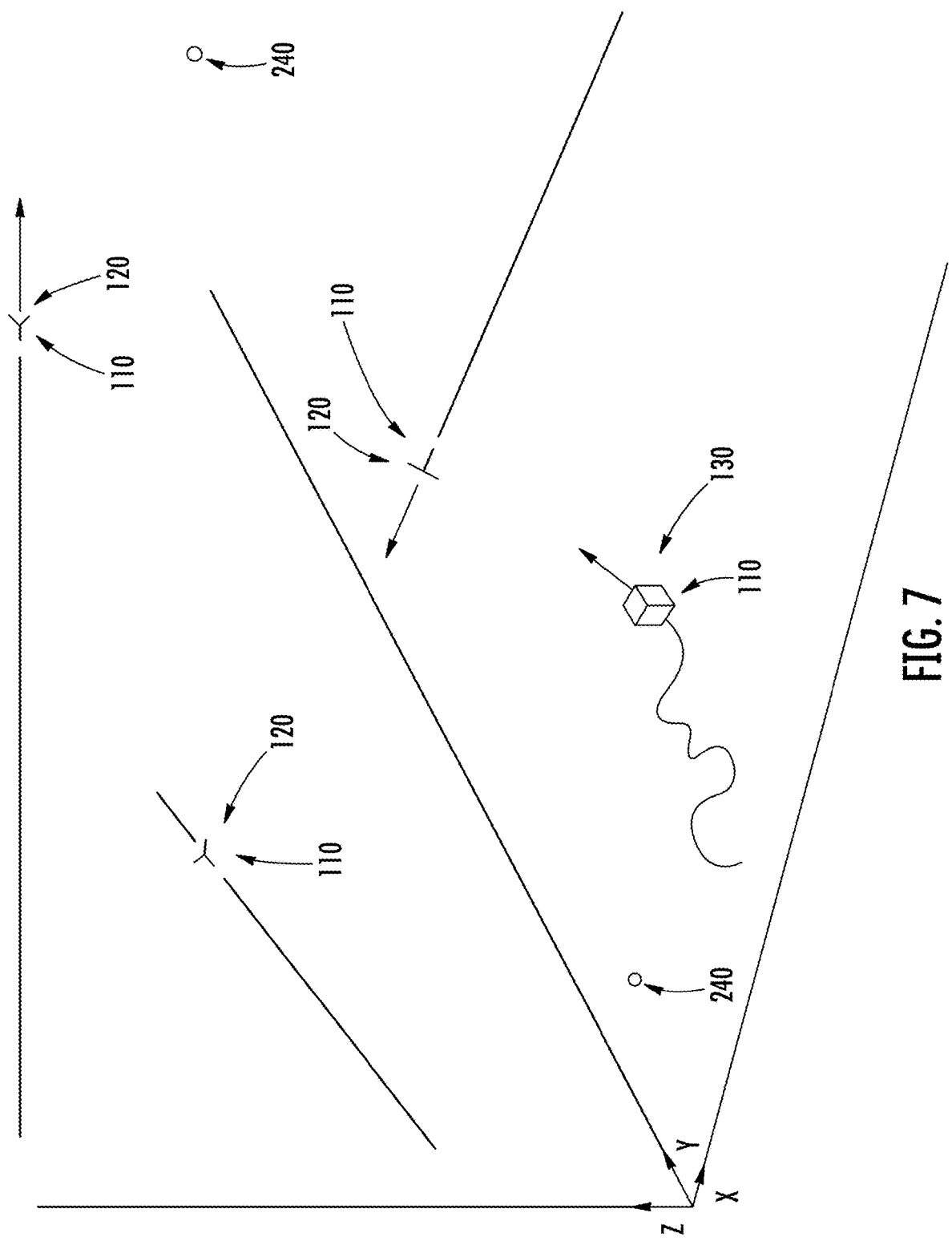
FIG. 7 is a graphical representation of a plot of unmanned mobile connected objects calculated by the command center with information from one or more neighboring tables.

The command center 125 may generate a graphical representation, as shown in FIG. 7, of the positions of the unmanned mobile connected objects 110. In certain embodiments, the command center 125 may generate a plot of each unmanned mobile connected object 110. The plot may be as simplistic as simply a schematic diagram of the location of each unmanned mobile connected object 110. The command center 125 may generate a display of each unmanned mobile connected object 110 together with paths already traveled and include projected future travel paths denoted differently than past travel paths. The display may be a two dimensional representation, a three dimensional representation or other. The command center 125 may generating a map with locations of the first and second unmanned mobile connected objects 110 with predicted travel paths.

The system 100 may be configured such that the plot of each unmanned mobile connected object 110 includes a reference point 240. The reference point 240 enables the graphical representation generated by the command center 125 to be positioned relative to other graphical representations. The system 100 may be configured, as shown in FIG. 6, such that the command center 125 can group unmanned mobile connected objects 110 into virtual groups 250. The system 100 may create virtual dynamic clouds for the groups of unmanned mobile connected objects 110. The virtual groups 250 of unmanned mobile connected objects 110 may include dynamic storage clouds, which may include all storage devices of the unmanned mobile connected objects 110 in the virtual group.

The system 100 may be configured such that the system may resynchronize with the one or more unmanned mobile connected objects 110. In particular, the system 100 may use an unmanned mobile connected object 110 to resynchronize with other unmanned mobile connected objects 110. The system 100 may be configured such that one of the unmanned mobile connected objects 110 is a master unmanned mobile connected object 110 and the remaining unmanned mobile connected objects 110 are slave unmanned mobile connected objects 110. The master unmanned mobile connected object 110 may synchronize with the slave unmanned mobile connected objects 110 associated with the master unmanned mobile connected object 110. When an unmanned mobile connected object 110 moves away from one reference point 240 and closer to another reference point 240, the system 100, such as the command center 125, may associate that unmanned mobile connected object 110 with the reference point 240 that is closer to the unmanned mobile connected object 110. As such, the unmanned mobile connected object 110 may resynchronize with the other unmanned mobile connected objects 110 synchronized to the closer reference point 240.

The system 100 may also be configured to search local available unmanned mobile connected objects 110 based upon current geolocations of the unmanned mobile connected objects 110. Local available unmanned mobile connected objects 110 may be those unmanned mobile connected objects 110 that are within communications range of the primary communications network 150. The system 100 may also be configured to search local available unmanned mobile connected objects 110 based upon predicted geolocations of the unmanned mobile connected objects 110.

Figure 3:
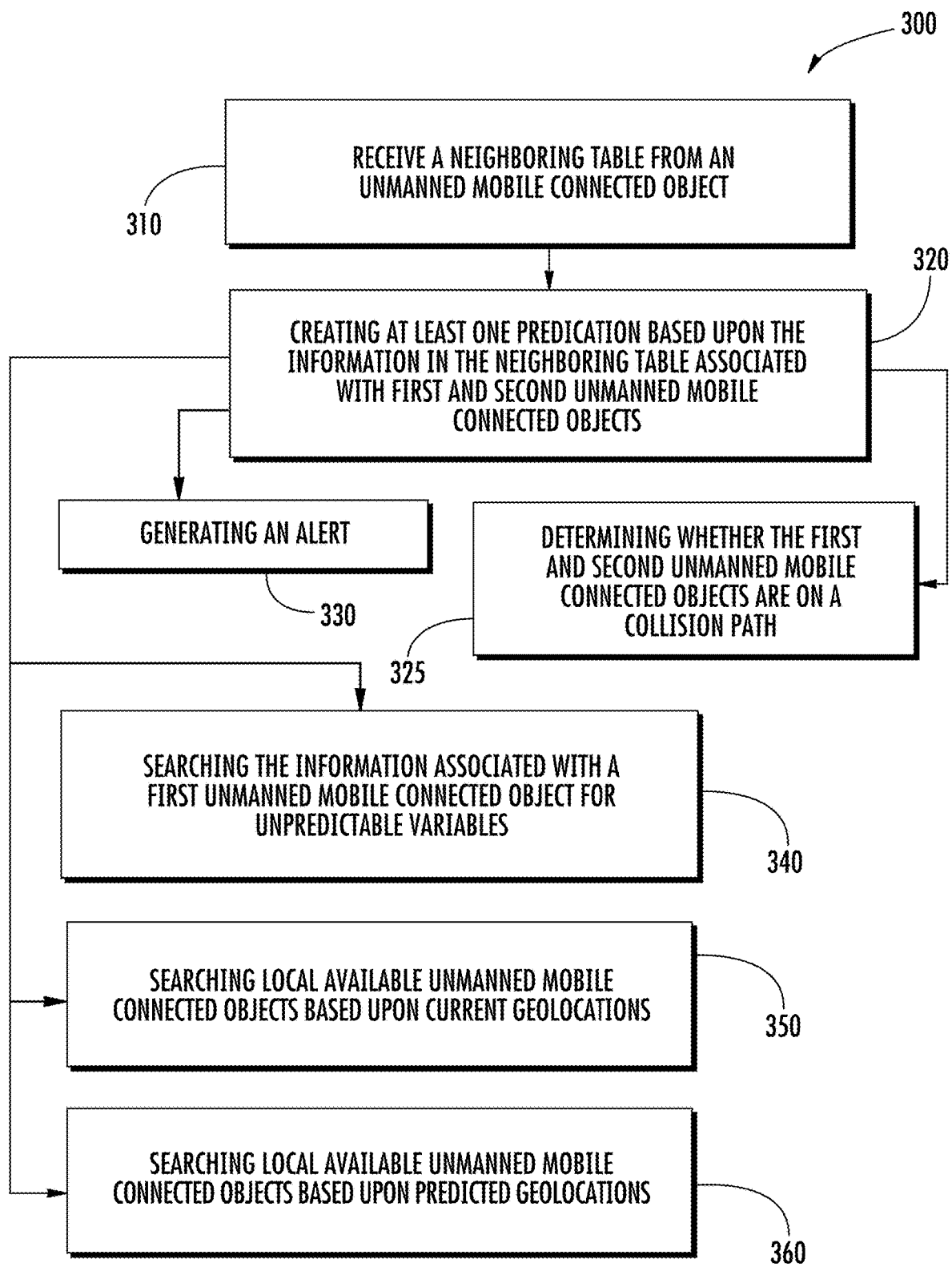
FIG. 3 is flow diagram illustrating a sample method for locating unmanned mobile connected objects.

A method 300 of using the system 100, as shown in FIG. 3, for locating unmanned mobile connected objects 110, such as, but not limited to, unmanned aerial vehicles (UAVs) 120, such as, but not limited to drones, and unmanned ground vehicles (UGVs) 130 is disclosed. The method 300 may include receiving at 310 a neighboring table 140 from a first unmanned mobile connected object 110, whereby the neighboring table 140 includes information associated with the first unmanned mobile connected object 110 and a second unmanned mobile connected object 110. The method 300 may include creating at 320 one or more predictions based upon the information in the neighboring table 140 associated with the first and second unmanned mobile connected objects. The step of creating at 320 the prediction based upon the information in the neighboring table includes determining whether the first and second unmanned mobile connected objects are on a collision path at 325.

The step of receiving at 310 the neighboring table 140 from the first unmanned mobile connected object 110 includes receiving the neighboring table 140 from the first unmanned mobile connected object 110 within repetitive predetermined time intervals. The step of creating predictions at 320 based upon the first information associated with a first unmanned mobile connected object 110 includes predicting a location of the first unmanned mobile connected object. If the first unmanned mobile connected object 110 is not in communication with the primary communications network 150, predicting a location of the first unmanned mobile connected object 110 is based upon a last received neighboring table 140 from the first unmanned mobile connected object.

The method 300 may also include generating an alert at 330 if an unmanned mobile connected object 110 that was in communication with the system 100 no longer communicates with the system 100 within the predetermined time interval indicating a potential loss of the unmanned mobile connected object 110. The method 300 may also include searching the information at 340 associated with a first unmanned mobile connected object 110 for unpredictable variables in the physical environment surrounding the first unmanned mobile connected object 110. The method 300 may also include searching at 350 local available unmanned mobile connected objects 110 based upon current geolocations. The method 300 may also include searching at 360 local available unmanned mobile connected objects based upon predicted geolocations. The method 300 may also include generating a map at 360 with locations of the first and second unmanned mobile connected objects 110 with predicted travel paths.

Figure 4:
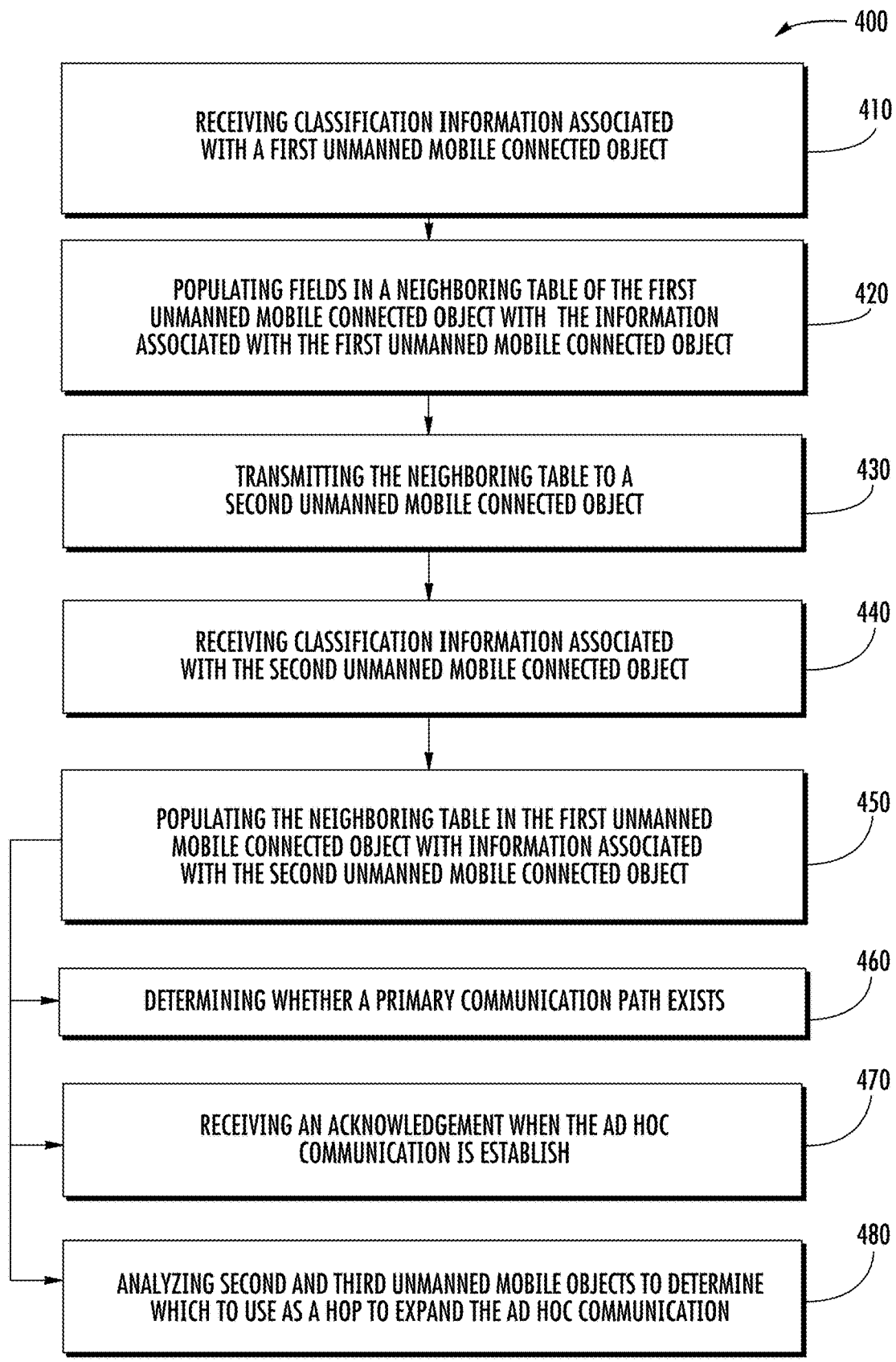
FIG. 4 is flow diagram illustrating a another method for locating unmanned mobile connected objects.

A method 400 of using the system 100, as shown in FIG. 4, for locating unmanned mobile connected objects 110, such as, but not limited to, unmanned aerial vehicles (UAVs) 120, such as, but not limited to drones, and unmanned ground vehicles (UGVs) 130 is disclosed. The method 400 may include a first unmanned mobile connected object 110 receiving at 410 classification information associated with the first unmanned mobile connected object 110. The method 400 may include populating fields at 420 in a neighboring table 140 of the first unmanned mobile connected object 110 with the information associated with the first unmanned mobile connected object 110. The method 400 may include transmitting at 430 the neighboring table 140 to a second unmanned mobile connected object 110. The method 400 may include receiving classification information at 440 associated with the second unmanned mobile connected object 110 to populate the neighboring table 140.

The method 400 may also include receiving classification information at 410 associated with the first unmanned mobile connected object 110 including, but not limited to, name, classification, status, geolocation and signal strength. The method 400 may also include populating the neighboring table 140 at 450 in the first unmanned mobile connected object 110 with the information associated with the second unmanned mobile connected object 110. The method 400 may also include transmitting at 460 the neighboring table 140 to a command center 125. The method 400 may also include determining at 460 whether a primary communication path exists between the first unmanned mobile connected object 110 and a network 150, and if a primary connection does not exist between the first unmanned mobile connected object 110 and the network 150, establishing an ad hoc communication connection with the second unmanned mobile connected object 110. The step of establishing an ad hoc communication connection at 460 may also include establishing an ad hoc communication connection with the second unmanned mobile connected object 110 if the second unmanned mobile connected object 110 shares a common classification of geographic area or capability with the first unmanned mobile connected object 110. The step of establishing an ad hoc communication connection at 460 may also include establishing an ad hoc communication connection with the second unmanned mobile connected object 110 via broadcasting requests to establish an ad hoc communication connection with the second unmanned mobile connected object 110. The method 400 may also include receiving an acknowledgement at 470 from the second unmanned mobile connected object 110 when the ad hoc communication connection is established. The method 400 may also include analyzing 480 the second unmanned mobile connected object 110 and a third unmanned mobile connected object 110 via the ad hoc communication to determine which to use as a hop to expand range of the ad hoc communication to connect with the network 150.

Figure 5:
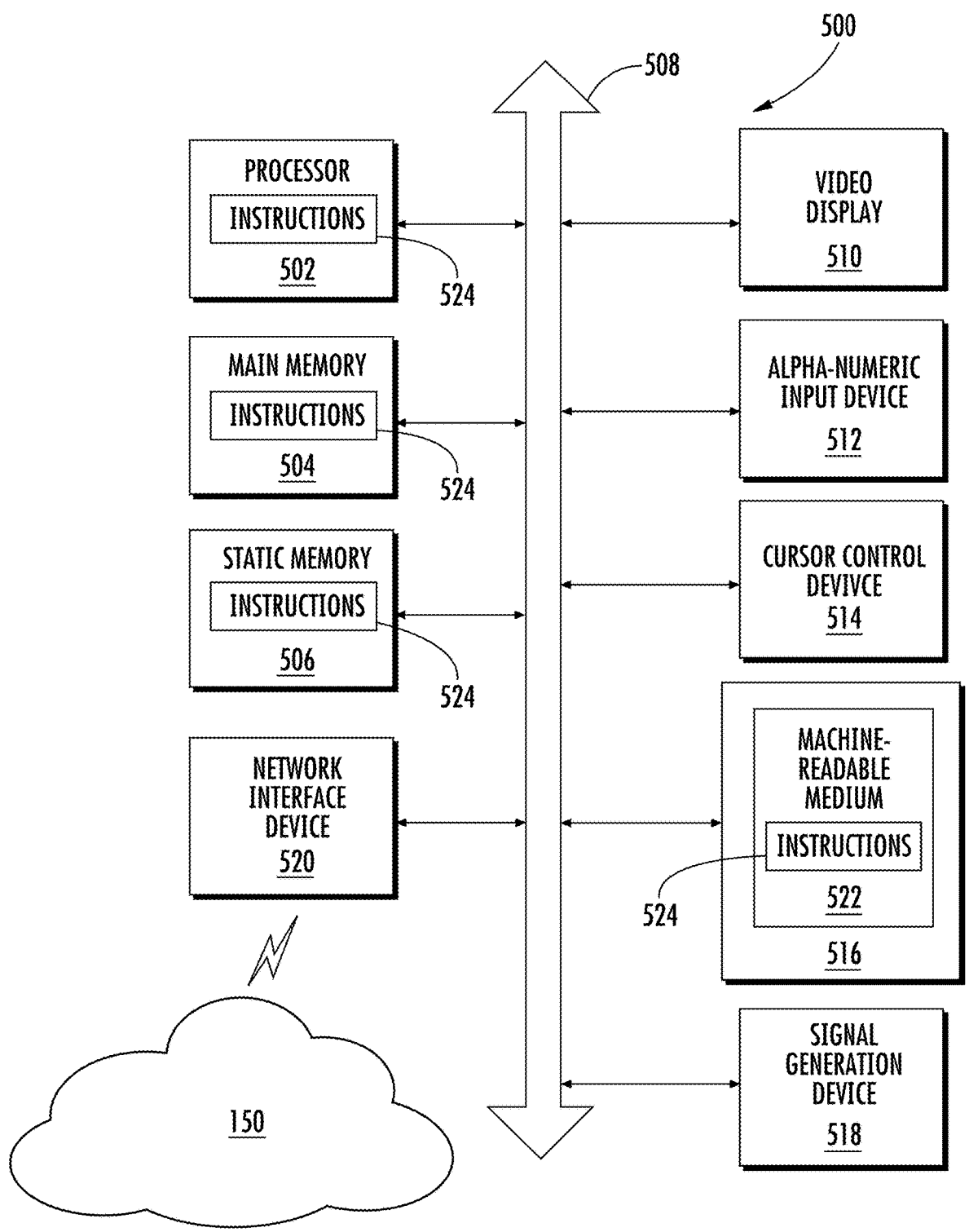
FIG. 5 is a schematic diagram of a machine in the form of a computer system within which a set of instructions, when executed, may cause the machine to perform any one or more of the methodologies or operations of the systems and methods for locating unmanned mobile connected objects.

As shown in FIG. 5, at least a portion of the methodologies and techniques described with respect to the exemplary embodiments of the system 100 can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 150, another network, or a combination thereof) to and assist with operations performed by other machines and systems, such as, but not limited to, a command center 125, a first user device 162, a second user device 170, an unmanned ground vehicle 130, a first unmanned aerial vehicle 180, a second unmanned aerial vehicle 182, a third unmanned aerial vehicle 184, a communications network 150, a first user device 160, a second user device 170, a server 190, a database 200, and an ad hoc communications network 210, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510, which may be, but is not limited to, a liquid crystal display (LCD), a flat panel, a solid state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of instructions 524, such as, but not limited to, software embodying any one or more of the methodologies or functions described herein, including those methods illustrated above. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 522 containing instructions 524 so that a device connected to the communications network 150, another network, or a combination thereof, can send or receive voice, video or data, and communicate over the communications network 150, another network, or a combination thereof, using the instructions. The instructions 524 may further be transmitted or received over the communications network 150, another network, or a combination thereof, via the network interface device 520. The machine-readable medium 522 may including instructions, which when executed by a processor, cause the processor to perform operations. The operations may include receiving a neighboring table 140 from a first unmanned mobile connected object. The neighboring table 140 may include information associated with the first unmanned mobile connected object 110 and a second unmanned mobile connected object 110. The operations may include creating one or more predictions based upon the information in the neighboring table associated with the first and second unmanned mobile connected objects 110. The machine-readable medium 522 may including instructions as set forth in the various methods above and other aspects disclosed above.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. The figures are also merely representational and may not be drawn to scale. Certain proportions thereof may be exaggerated, while others may be minimized. Accordingly, the specification and drawings are to be regarded in an illustrative rather than a restrictive sense.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A first unmanned mobile connected object, comprising:
   a processor; and
   a memory storing instructions that cause the processor to perform operations, the operations comprising:
      receiving first information associated with the first unmanned mobile connected object, wherein the first information indicates a first classification of the first unmanned mobile connected object;
      populating first fields in a neighboring table of the first unmanned mobile connected object with the first information, wherein the neighboring table comprises entries indicative of a plurality of mobile connected objects with which the first unmanned mobile connected object has directly communicated;
      transmitting the neighboring table to a second unmanned mobile connected object;
      receiving second information associated with the second unmanned mobile connected object, wherein the second information indicates a second classification of the second unmanned mobile connected object;
      populating second fields of the neighboring table with the second information; and
      predicting, based on the neighboring table, whether the first unmanned mobile connected object and the second unmanned mobile connected object are on a collision path.

2. The first unmanned mobile connected object of claim 1, wherein the first information further comprises a name of the first unmanned mobile connected object, a status, a geolocation and a signal strength.

3. The first unmanned mobile connected object of claim 1, the operations further comprising transmitting the neighboring table to a command center.

4. The first unmanned mobile connected object of claim 1, the operations further comprising:
   determining whether a primary communication path exists between the first unmanned mobile connected object and a network, and
   based on the primary communication path not existing, establishing an ad hoc communication connection with the second unmanned mobile connected object.

5. The first unmanned mobile connected object of claim 4, the operations further comprising:
   determining whether the second unmanned mobile connected object shares a common classification of geographic area or capability with the first unmanned mobile connected object,
   wherein establishing the ad hoc communication connection is further based on the first unmanned mobile connected object and the second unmanned mobile connected object sharing the common classification.

6. The first unmanned mobile connected object of claim 4, wherein establishing the ad hoc communication connection comprises transmitting broadcasting requests to the second unmanned mobile connected object.

7. The first unmanned mobile connected object of claim 6, wherein establishing the ad hoc communication connection comprises receiving an acknowledgement from the second unmanned mobile connected object, the acknowledgement indicative of the ad hoc communication connection having been established.

8. The first unmanned mobile connected object of claim 4, the operations further comprising:
   analyzing the second unmanned mobile connected object and a third unmanned mobile connected object via the ad hoc communication connection to determine whether to use the second unmanned mobile connected object or the third unmanned mobile connected object as a hop to expand range of the ad hoc communication connection to connect with the network.

9. A system, comprising:
   a processor; and
   a memory storing instructions that cause the processor executing the instructions to perform operations, the operations comprising:
      receiving a neighboring table from a first unmanned mobile connected object, wherein the neighboring table includes first information associated with the first unmanned mobile connected object and second information associated with a second unmanned mobile connected object, wherein the first information indicates a first classification of the first unmanned mobile connected object and the second information indicates a second classification of the second unmanned mobile connected object, and wherein the neighboring table comprises entries indicative of a plurality of mobile connected objects with which the first unmanned mobile connected object has directly communicated; and creating at least one prediction based upon the information in the neighboring table associated with the first unmanned mobile connected object and the second unmanned mobile connected object, wherein the at least one prediction comprises predicting whether the first unmanned mobile connected object and the second unmanned mobile connected object are on a collision path.

10. The system of claim 9, wherein receiving the neighboring table from the first unmanned mobile connected object comprises receiving the neighboring table from the first unmanned mobile connected object within repetitive predetermined time intervals.

11. The system of claim 9, wherein the at least one prediction comprises a predicted location of the first unmanned mobile connected object.

12. The system of claim 11, wherein the first unmanned mobile connected object is not in communication with the system and the predicted location is based upon a last received neighboring table from the first unmanned mobile connected object.

13. The system of claim 10, the operations further comprising:

generating an alert if an unmanned mobile connected object that was in communication with the system no longer communicates with the system within the repetitive predetermined time intervals, the alert indicating a potential loss of the unmanned mobile connected object.

14. The system of claim 9, the operations further comprising:

searching the information associated with the first unmanned mobile connected object for unpredictable variables in a physical environment surrounding the first unmanned mobile connected object.

15. The system of claim 9, the operations further comprising:

searching for local available unmanned mobile connected objects based upon current geolocations associated with the local available unmanned mobile connected objects.

16. The system of claim 9, the operations further comprising:

searching for local available unmanned mobile connected objects based upon predicted geolocations associated with the local available unmanned mobile connected objects.

17. The system of claim 9, the operations further comprising:

generating a map with locations of the first and second unmanned mobile connected objects with predicted travel paths.

18. A computer-readable device comprising instructions that cause a processor executing the instructions to perform operations comprising:

receiving a neighboring table from a first unmanned mobile connected object, wherein the neighboring table includes first information associated with the first unmanned mobile connected object and second information associated with a second unmanned mobile connected object, wherein the first information indicates a first classification of the first unmanned mobile connected object and the second information indicates a second classification of the second unmanned mobile connected object, and wherein the neighboring table comprises entries indicative of a plurality of mobile connected objects with which the first unmanned mobile connected object has directly communicated; and creating at least one prediction based upon the information in the neighboring table associated with the first unmanned mobile connected object and the second unmanned mobile connected object, wherein the at least one prediction comprises predicting whether the first unmanned mobile connected object and the second unmanned mobile connected object are on a collision path.

* * * * *